United States Patent
Binek et al.

(10) Patent No.: US 12,312,970 B2
(45) Date of Patent: May 27, 2025

(54) LUBRICATION NETWORK FOR AN ATTRITABLE ENGINE

(71) Applicant: RTX Corporation, Farmington, CT (US)

(72) Inventors: Lawrence A. Binek, Glastonbury, CT (US); Leslie F. Guzman, West Palm Beach, FL (US); Sean R. Jackson, Palm City, FL (US); Evan J. Butcher, Suffield, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/430,319

(22) Filed: Feb. 1, 2024

(65) Prior Publication Data

US 2024/0175375 A1 May 30, 2024

Related U.S. Application Data

(60) Division of application No. 17/856,630, filed on Jul. 1, 2022, now Pat. No. 11,891,908, which is a
(Continued)

(51) Int. Cl.
*F01D 25/18* (2006.01)
*B33Y 10/00* (2015.01)
(Continued)

(52) U.S. Cl.
CPC .............. *F01D 25/18* (2013.01); *B33Y 10/00* (2014.12); *B33Y 80/00* (2014.12); *F01D 25/16* (2013.01);
(Continued)

(58) Field of Classification Search
CPC ........ B22F 5/009; F02C 7/06; F16C 33/6659; F16N 7/32
See application file for complete search history.

(56) References Cited

U.S. PATENT DOCUMENTS 2,702,093 A * 2/1955 Sherrill ................... F01D 25/18
417/406
3,501,245 A 3/1970 Ivanko
(Continued)

FOREIGN PATENT DOCUMENTS

CN 108590859 B 3/2021
EP 1364745 A2 * 11/2003 ........... B05B 7/0458
(Continued)

OTHER PUBLICATIONS

EP-1364745-A2 Translation (Year: 2006).*
(Continued)

*Primary Examiner* — Michael W Hotchkiss
(74) *Attorney, Agent, or Firm* — Getz Balich LLC

(57) ABSTRACT

A gas turbine engine with a lubrication system includes a ball bearing assembly and a rotor circumscribing a rotational axis and journaled within the ball bearing assembly. The gas turbine engine also includes a lubrication system located radially outward from a rotational axis and radially outward and adjacent to the ball bearing assembly, which includes a lubrication channel having an inlet and an outlet and a dispersion cone adjacent to the outlet of the lubrication channel.

19 Claims, 2 Drawing Sheets

Related U.S. Application Data continuation of application No. 16/736,385, filed on Jan. 7, 2020, now Pat. No. 11,377,977.

(51) Int. Cl.
*B33Y 80/00* (2015.01)
*F01D 25/16* (2006.01)

(52) U.S. Cl.
CPC ...... *F05D 2260/98* (2013.01); *F16C 2360/23* (2013.01)

(56) References Cited

U.S. PATENT DOCUMENTS

| | | | | |
|---|---|---|---|---|
| 3,885,842 A | * | 5/1975 | Furutsu | F16C 33/6662 384/468 |
| 3,940,191 A | * | 2/1976 | Tomioka | B21B 31/076 384/468 |
| 4,971,184 A | * | 11/1990 | Lederman | F16D 13/74 192/48.92 |
| 5,020,636 A | * | 6/1991 | Daeges | F16N 7/32 184/7.4 |
| 5,692,682 A | * | 12/1997 | Soule | B05B 7/10 239/432 |
| 7,194,866 B1 | * | 3/2007 | Jones | F02K 7/10 60/39.08 |
| 7,216,473 B1 | | 5/2007 | McArthur | |
| 7,748,208 B2 | * | 7/2010 | Jewess | F02C 7/06 60/39.08 |
| 7,748,209 B1 | | 7/2010 | Schopf | |
| 8,028,936 B2 | * | 10/2011 | McDermott | F01D 25/002 239/487 |
| 8,672,550 B1 | | 3/2014 | Peterson | |
| 9,421,557 B2 | * | 8/2016 | Dziadzio | A62C 31/05 |
| 9,951,646 B2 | * | 4/2018 | Byrd | B08B 7/00 |
| 11,377,977 B2 | | 7/2022 | Binek | |
| 2008/0127627 A1 | * | 6/2008 | Jewess | F01D 25/20 60/39.08 |
| 2014/0369811 A1 | | 12/2014 | Malins | |
| 2017/0234368 A1 | * | 8/2017 | Mori | F16C 33/6659 384/467 |
| 2017/0298830 A1 | | 10/2017 | Ertas | |
| 2017/0334023 A1 | * | 11/2017 | Mohr | B22F 7/08 |
| 2017/0350275 A1 | * | 12/2017 | Von Berg | B05B 15/65 |
| 2019/0055854 A1 | | 2/2019 | Chenoux | |
| 2020/0277889 A1 | * | 9/2020 | Ghribi | B05B 15/40 |
| 2021/0062679 A1 | * | 3/2021 | Marquie | F01D 25/183 |

FOREIGN PATENT DOCUMENTS

| | | |
|---|---|---|
| EP | 2815106 B1 | 4/2017 |
| WO | WO-2018233745 A1 * | 12/2018 |

OTHER PUBLICATIONS

WO-2018233745-A1 Translation (Year: 2018).*

"Ball Bearing Cages, Retainers, Ball Separators", AST Bearings [online], 2010, https://archive.org/web/20101205093801/http://www.astbearings.com:80/ball-bearing-cages-retainers-ball-separators.html.

* cited by examiner

LUBRICATION NETWORK FOR AN ATTRITABLE ENGINE

This application is a divisional of U.S. patent application Ser. No. 17/856,630 filed Jul. 1, 2022 which is a continuation of U.S. patent application Ser. No. 16/736,385 filed Jan. 7, 2020, both of which applications are hereby incorporated herein by reference in their entireties.

BACKGROUND

The present disclosure relates generally to attritable aircraft engines. More specifically, this disclosure relates to a lubrication network of an attritable aircraft engine.

Attritable aircraft can include, for example, Unpiloted (or Unmanned) Aerial Vehicles (UAVs) and expendable turbojet systems for guided munitions, missiles, and decoys. Attritable aircraft are generally designed as limited lifetime vehicles, with expected lifetimes as short as a single use or single mission vehicle. As such, many components and features common in traditional piloted aircraft are unnecessary or can be simplified for attritable aircraft applications, including fluid dispensing systems.

Fluid dispensing system in aircraft systems can have five or more individual parts, each requiring assembly, which can be expensive and time consuming. Furthermore, cross drilling through the engine support structures has conventionally been used in order to create necessary fluid passageways, which adds additional labor and expense to the manufacturing process.

Proper lubrication is essential for a variety of engine components, including ball bearing assemblies. Improper lubrication can lead to over-heating of system critical parts, which can cause catastrophic failure. On the one hand, enough lubrication fluid must be provided to ensure sufficient cooling of the bearings under all working conditions of the gas turbine engine. On the other hand, excessive lubrication fluid may require larger fluid pumps and piping systems than necessary, increasing the footprint of the lubrication system and the overall cost and weight of the aircraft engine. Furthermore, pumping unnecessary lubrication fluid through an engine system uses energy that could be used elsewhere in the system. As such, providing too much lubrication fluid results in a less efficient gas turbine engine compared to a gas turbine engine provided with a proper amount of lubrication fluid.

SUMMARY

A gas turbine engine with a lubrication system includes a ball bearing assembly and a rotor circumscribing a rotational axis and journaled within the ball bearing assembly. The gas turbine engine also includes a lubrication system located radially outward from a rotational axis and radially outward and adjacent to the ball bearing assembly, which includes a lubrication channel having an inlet and an outlet and a dispersion cone adjacent to the outlet of the lubrication channel.

A method of manufacturing a gas turbine engine with a lubrication system includes journaling a rotor within a ball bearing assembly and circumscribing a rotational axis. The method also includes additively manufacturing a lubrication system located radially outward from a rotational axis and radially outward and adjacent to the ball bearing assembly, which has a lubrication channel with an inlet and an outlet and a dispersion cone adjacent to the outlet of the lubrication channel.

DETAILED DESCRIPTION

An attritable engine with an integrally built fluid dispensing system simplifies manufacturing. An attritable engine can leverage additive manufacturing techniques to improve various aspects of the limited-life engine. For example, additive manufacturing allows assembly details to be unitized, and simultaneously permits integration of many complex performance-enhancing features. The additive manufacture of the engine reduces the time to delivery to the customer and lowers the overall production costs of the unit.

Disclosed herein is a lubrication system having a dispersion cone configured to form a mist of lubricant, which evenly covers the exterior surface of the outer races. The evenly distributed lubricant cools ball bearing assemblies during operation of the engine. Furthermore, the lubrication system can be additively manufactured, obviating the need for cross-drilling of the compressor section and saving time and expense associated with cross-drilling operations. As such, unitizing the manufacturing and assembly details, while integrating complex performance-enhancing features using additive manufacturing techniques, lowers the overall production costs and manufacturing time.

Figure 1:
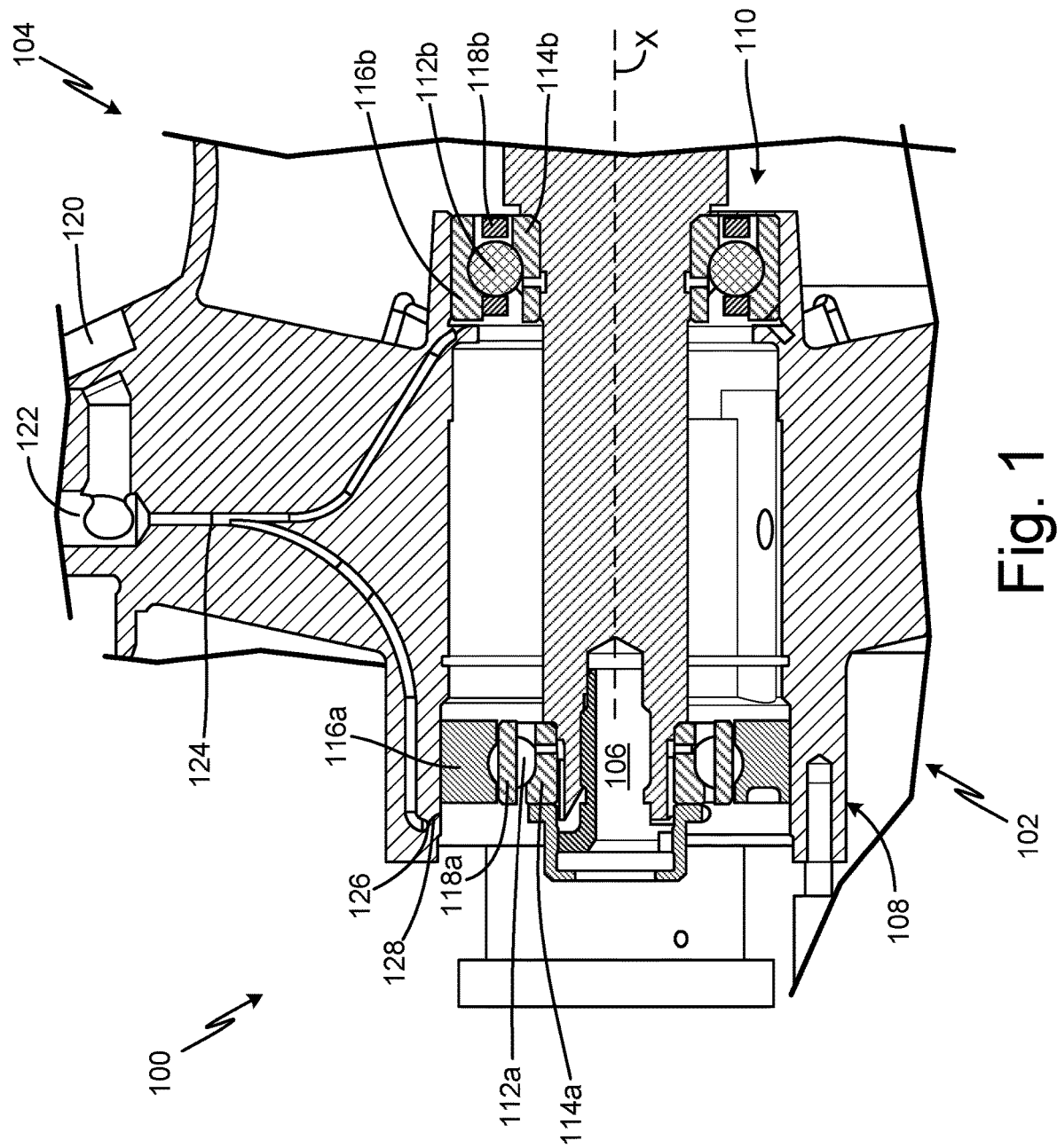
FIG. 1 is a cross-sectional view of an attritable engine with a lubrication system.

FIG. 1 shows attritable engine 100 including compressor section 102, lubrication system 104, rotor 106, forward ball bearing assembly 108, rearward ball bearing assembly 110, ball bearings 112a and 112b, inner races 114a and 114b, outer races 116a and 116b, retaining clips 118a and 118b, lubrication channel inlet 120, lubrication distribution rail 122, lubrication channel 124, lubrication channel outlet 126, and dispersion cone 128.

Compressor section 102 houses lubrication system 104 and rotor 106, which is journaled in forward ball bearing assembly 108 and rearward ball bearing assembly 110. Forward ball bearing assembly 108 includes ball bearing 112a surrounded by inner race 114a and outer race 116a and retained in place by retaining clip 118a. Similarly, rearward ball bearing assembly 110 includes ball bearing 112b surrounded by inner race 114b and outer race 116b and retained in place by retaining clip 118b.

Operationally, air enters the forward end of compressor section 102 and is compressed by compressor blades and vanes. Compressed air and fuel enter a combustor where the compressed air and fuel are mixed and ignited. The resulting high-temperature gas from the combustor enters a turbine section and drives the rotation of turbine blades, which in turn generates power by turning rotor 106 circumferentially about an axis of rotation. Gas exits the engine out of the aft end of an exhaust section.

Lubrication system 104 provides lubricant to forward and rearward ball bearing assemblies 108 and 110 from a lubricant source such as, for example, a fuel tank or an oil tank. Lubricant can be any fluid that provides cooling to bearings 112a and 112b such as, for example, fuel and oil. Lubricant enters lubrication system 104 from a lubricant source at lubricant channel inlet 120 and is delivered to lubrication distribution rail 122, which distributes lubricant to lubrication channel 124. Lubrication distribution rail 122 can distribute lubricant to more than one lubrication channel 124. One or more of the lubrication channels can have a curved shape along all, substantially all, or just part of its length. Lubrication distribution rail 122 circumferentially travels around the engine casing and may travel all the way around the engine casing or only partially around the engine casing, distributing lubricant to multiple lubrication channels 124.

Lubricant exits lubrication system 104 at lubrication channel outlet 126 and is dispersed in dispersion cone 128, which has a frustoconical shape and is configured to diffuse the lubricant as the lubricant travels through dispersion cone 128. Diffusion of the lubricant helps the lubricant form a fine mist. The lubricant exits dispersion cone 128 and is distributed on the exterior surface of outer races 116a and 116b. Dispersion cone 128 may also be referred to as a diffuser.

Figure 2:
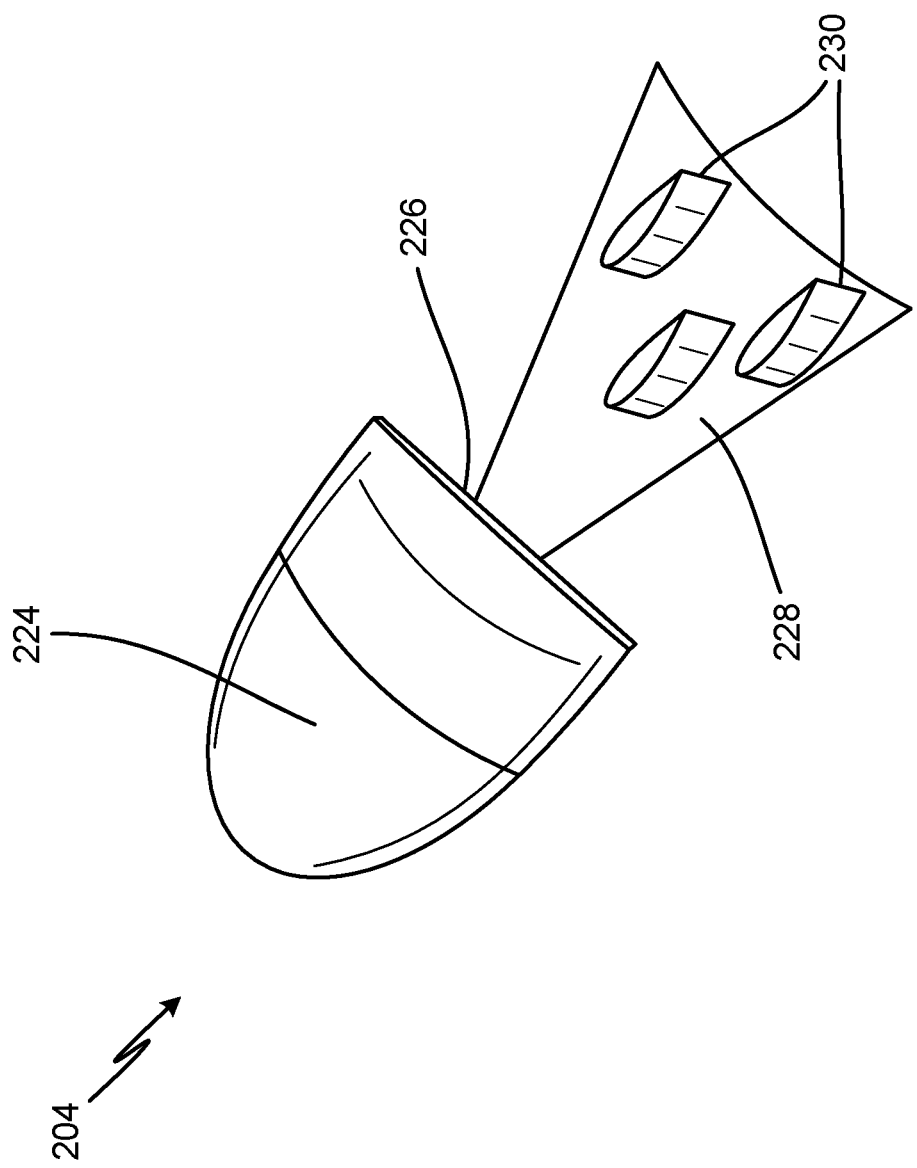
FIG. 2 is a cross-sectional view of a spray cone with an airfoil distribution array.

FIG. 2 is a cross-sectional view of a spray cone with an airfoil distribution array. FIG. 2 shows lubrication system 204 including lubrication channel 224, lubrication channel outlet 226, dispersion cone 228, and dispersion enhancements features 230. Lubrication system 204 depicts one embodiment of lubrication channel 124, lubrication channel outlet 126, and dispersion cone 128.

Lubricant exits lubrication channel 224 of lubrication system 204 at lubrication channel outlet 226 and is dispersed in dispersion cone 228, which has a frustoconical shape and is configured to diffuse the lubricant as the lubricant travels through dispersion cone 228. Dispersion enhancement features 230 increase the dispersion or atomization of the lubricant as the lubricant travels through dispersion cone 228 compared to a dispersion cone without any dispersion enhancement features.

Dispersion enhancement features 230 can have any geometry, size, or shape that increases the dispersion or atomization of the lubricant as the lubricant travels through dispersion cone 228. In one embodiment, as depicted in FIG. 2, dispersion enhancement features 230 have an airfoil shape. In other embodiments, dispersion enhancement features 230 can be spars, ramps, indentations, and combinations thereof.

Lubrication systems 104 and 204 can be formed of stainless steel. In other embodiments, lubrication systems 104 and 204 can be formed of aluminum, titanium, copper, cobalt, iron, nickel, and alloys thereof. Lubrication system 104 is built integral and conformal with attritable engine 100 and can be manufactured using additive manufacturing techniques such as laser powder bed fusion, electron beam melting, and glue binder jetting.

Lubrication systems 104 and 204 have dispersion cones configured to form a mist of lubricant. This mist evenly covers the exterior surface of the outer races, thereby efficiently cooling ball bearing assemblies during operation of the engine. Furthermore, these lubrication systems can be additively manufactured, which simplifies the manufacturing process by obviating the need for cross-drilling of the compressor section and allows for the lubrication channels to be curved in whole or in part. Forgoing subtractive manufacturing techniques such as drilling saves the time and expense associated with subtractive manufacturing operations. As such, unitizing the manufacturing and assembly details, while integrating complex performance-enhancing features using additive manufacturing techniques, lowers overall production costs and engine manufacturing time.

DISCUSSION OF POSSIBLE EMBODIMENTS

The following are non-exclusive descriptions of possible embodiments of the present invention.

A gas turbine engine with a lubrication system includes a ball bearing assembly and a rotor circumscribing a rotational axis and journaled within the ball bearing assembly. The gas turbine engine also includes a lubrication system located radially outward from a rotational axis and radially outward and adjacent to the ball bearing assembly, which includes a lubrication channel having an inlet and an outlet and a dispersion cone adjacent to the outlet of the lubrication channel.

The gas turbine engine of the preceding paragraph can optionally include, additionally and/or alternatively, any one or more of the following features, configurations and/or additional components:

The ball bearing assembly of the gas turbine engine includes an inner race attached to the rotor, a ball bearing adjacent to and located radially outward of the inner race, an outer race adjacent to and located radially outward of the ball bearing, and a retaining clip adjacent to the outer race and configured to retain the ball bearing assembly in place.

The dispersion cone is adjacent to an exterior surface of the ball bearing assembly and configured to evenly coat the ball bearing assembly with a lubricant.

The dispersion cone of the gas turbine engine includes a dispersion enhancement feature.

The dispersion enhancement feature is at least one airfoil shaped spar.

The dispersion enhancement feature is at least one of a spar, ramp, indentation, and combinations thereof.

The dispersion enhancement feature is configured to provide a mist to evenly coat the exterior surface of the ball bearing assembly with a lubricant.

The dispersion cone has a frustoconical shape with a base that is adjacent to the ball bearing assembly and an apex that is adjacent to the outlet of the lubrication channel.

The dispersion cone is oriented with the base of the frustoconical shape adjacent to the ball bearing assembly and the apex of the frustoconical shape adjacent to the outlet of the lubrication channel.

At least a portion of the length of the lubrication channel is curved.

The lubrication system is part of the housing of the compressor of the gas turbine engine.

A method of manufacturing a gas turbine engine with a lubrication system includes journaling a rotor within a ball bearing assembly and circumscribing a rotational axis. The method also includes additively manufacturing a lubrication system located radially outward from a rotational axis and radially outward and adjacent to the ball bearing assembly, which has a lubrication channel with an inlet and an outlet and a dispersion cone adjacent to the outlet of the lubrication channel.

The method of the preceding paragraph can optionally include, additionally and/or alternatively, any one or more of the following features, configurations and/or additional components:

The method includes additively manufacturing the rotor and additively manufacturing the ball bearing assembly.

The dispersion cone is adjacent to an exterior surface of the ball bearing assembly and configured to evenly coat the ball bearing assembly with a lubricant.

The dispersion cone includes a dispersion enhancement feature.

The dispersion enhancement feature is at least one airfoil shaped spar.

The dispersion enhancement feature is at least one of a spar, ramp, indentation, and combinations thereof.

The dispersion enhancement feature is configured to provide a mist to evenly coat the exterior surface of the ball bearing assembly with a lubricant.

The dispersion cone has a frustoconical shape, oriented with the base of the frustoconical shape adjacent to the ball bearing assembly and the apex of the frustoconical shape adjacent to the outlet of the lubrication channel.

At least a portion of the length of the lubrication channel is curved.

The lubrication system is part of the housing of the compressor of the gas turbine engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of manufacturing a gas turbine engine, the method comprising: journaling a rotor within a bearing assembly, the rotor rotatable about a rotational axis; and additively manufacturing a lubrication system configured to be located radially outward of and in fluid communication with the bearing assembly, the lubrication system comprising: a lubrication channel including an inlet and an outlet; and a dispersion cone configured to receive lubricant from the outlet, the dispersion cone being a diffuser, and the dispersion cone comprising a plurality of spars in an array, each of the plurality of spars within an interior of the dispersion cone, each of the plurality of spars formed integral with the dispersion cone, and each of the plurality of spars configured to disperse the lubricant traveling through the dispersion cone wherein the dispersion cone has a frustoconical shape with a base and an apex; the base adjacent the bearing assembly; and the apex adjacent the outlet of the lubrication channel.

2. The method of claim 1, further comprising additively manufacturing the rotor.

3. The method of claim 1, further comprising additively manufacturing the bearing assembly.

4. The method of claim 1, wherein at least a portion of a length of the lubrication channel is curved.

5. The method of claim 1, wherein the lubrication system is part of a housing of a compressor of the gas turbine engine.

6. The method of claim 1, wherein each of the plurality of spars extends between a leading edge and a trailing edge; and the trailing edge has a sharp profile.

7. The method of claim 1, wherein the bearing assembly comprises a ball bearing assembly.

8. The method of claim 1, wherein the dispersion cone is located at the outlet of the lubrication channel.

9. The method of claim 1, wherein each of the plurality of spars comprises a foil.

10. The method of claim 1, wherein the bearing assembly further comprises an inner race mounted to the rotor;

an outer race circumscribing the inner race;

a bearing element radially between and engaged with the inner race and the outer race; and a retaining clip adjacent to the outer race and configured to retain the bearing element in place.

11. The method of claim 1, wherein the dispersion cone is adjacent an exterior surface of the bearing assembly and configured to evenly coat the bearing assembly with the lubricant.

12. The method of claim 11, wherein each of the plurality of spars is configured to provide a mist to evenly coat the exterior surface of the bearing assembly with the lubricant.

13. The method of claim 1, wherein each of the plurality of spars extends between a leading edge and a trailing edge; and the leading edge has a blunt profile.

14. The method of claim 13, wherein the trailing edge has a sharp profile.

15. A method of manufacturing a gas turbine engine, the method comprising: providing a rotor within a bearing assembly, the rotor rotatable about a rotational axis; forming a lubrication system that includes a lubrication channel including an inlet and an outlet; and a dispersion cone configured to receive lubricant from the outlet, the dispersion cone being a diffuser, and the dispersion cone comprising a plurality of spars in an array, each of the plurality of spars within an interior of the dispersion cone, each of the plurality of spars formed integral with the dispersion cone, and each of the plurality of spars configured to disperse the lubricant traveling through the dispersion cone; and arranging the rotor, the bearing assembly and the lubrication system together such that the lubrication system is disposed radially outside of and in fluid communication with the bearing assembly wherein the dispersion cone has a frustoconical shape with a base and an apex: the base adjacent the bearing assembly; and the apex adjacent the outlet of the lubrication channel.

16. The method of claim 15, wherein the forming of the lubrication system comprises additively manufacturing the lubrication system.

17. The method of claim 15, wherein each of the plurality of spars extends between a leading edge and a trailing edge; and the trailing edge has a sharp profile.

18. The method of claim 15, wherein each of the plurality of spars extends between a leading edge and a trailing edge; and the leading edge has a blunt profile.

19. The method of claim 18, wherein the trailing edge has a sharp profile.

* * * * *